United States Patent [19]

Rudolph

[11] 4,065,273

[45] Dec. 27, 1977

[54] PROCESS FOR BREAKING EMULSIONS IN A TAR-CONTAINING AQUEOUS CONDENSATE

[75] Inventor: Paul Rudolph, Bad Homburg, Germany

[73] Assignee: Metallgesellschaft Aktiengesellschaft, Frankfurt am Main, Germany

[21] Appl. No.: 663,880

[22] Filed: Mar. 4, 1976

[30] Foreign Application Priority Data

Sept. 30, 1975 Germany ............................ 2543532

[51] Int. Cl.$^2$ ............................................. B01D 47/00
[52] U.S. Cl. ......................................... 55/50; 55/228; 55/85
[58] Field of Search ................. 55/45, 46, 50, 228, 55/85, 89, 27; 210/21, 22, 83, 84; 252/327, 330; 203/87

[56] References Cited

U.S. PATENT DOCUMENTS

| 2,224,228 | 12/1940 | Lunn et al. ........................ 252/330 |
| 2,761,563 | 9/1956 | Waterman et al. .................... 210/21 |
| 2,817,411 | 12/1957 | Coberly ............................... 55/85 |
| 3,620,971 | 11/1971 | Plumbar ........................... 252/330 X |

*Primary Examiner*—John Adee
*Assistant Examiner*—E. Rollins Cross
*Attorney, Agent, or Firm*—Burgess, Dinklage & Sprung

[57] ABSTRACT

Gravity separation process for removing tar from water in a condensate formed by the cooling of a raw gas produced by the gasification or dry distillation of solid fuel such as coal. The tar and water condensate formed by cooling the raw gas to about 100° C is enriched in a tar-water separator with ammonium carbonate to a concentration of at least 5 grams $NH_3$ per kg $H_2O$. The cooling can be carried out in a plurality of stages with the hotter condensate from at least one of the first cooling stages being mixed at a weight ratio of 10:1 to 1:2 with colder condensate from at least one of the succeeding cooling stages.

5 Claims, 1 Drawing Figure

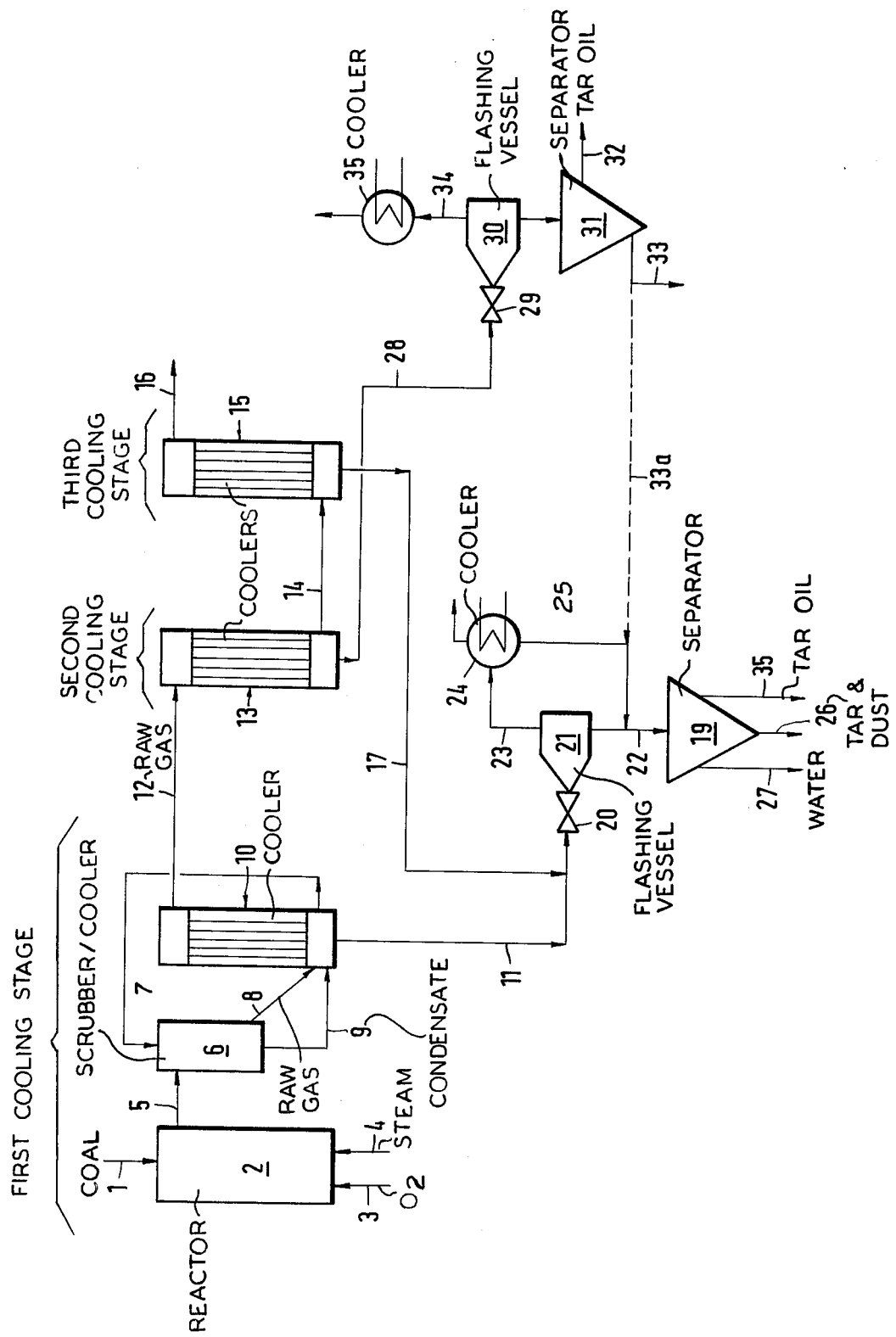

PROCESS FOR BREAKING EMULSIONS IN A TAR-CONTAINING AQUEOUS CONDENSATE

BACKGROUND

This invention relates to a gravity separation process for removing tar from water in a condensate formed by cooling of a raw gas produced by the gasification or dry distillation of solid fuels, particularly coal.

The cooling of gas produced by the gasification or dry distillation of coal results in the formation of a condensate containing water and tarry constituents. The water (sometimes referred to as gas-water) contains water-soluble products of the dry distillation of coal, such as phenols and fatty acids, and also dissolved gases, mainly $CO_2$ and $NH_3$, and products which are not soluble in water, such as tar, tar oil, gasoline or petrol from gas, and coal dust and ash dust.

The gasification of coal under normal pressure or superatmospheric pressure by a treatment with oxygen and water vapor and, if desired, other gasifying agents, such as $CO_2$, is known, e.g., from the Printed German Application 1,021,116. The dry distillation of coal to produce town gas is also a known process.

The raw gas produced by the gasification and dry distillation of solid fuels, particularly coal, is cooled before it is further used. The cooling results in the condensation of water vapors and of products of the dry distillation of coal, and part of the dry distillation products as well as entrained dust and other inorganic products are scrubbed off by the condensation which accompanies the cooling.

The cooling and the accompanying condensation result in a condensate which contains a proportionally large amount of $H_2O$ and also contains the products of the dry distillation of coal. These dry distillation products consist mainly of tar, which is composed of various compounds. The latter may be divided into three fractions, the first of which contains the high-boiling constituents which have higher specific gravity than water. The lower-boiling, so-called tar oil fraction has a lower specific gravity than water. The third fraction is the so-called gasoline or petrol from gas and differs from the tar oil by an even lower specific gravity and from tar and tar oil in that it has only a very low content of oxygen compounds.

When it is desired to subject the two heaviest fractions together with the gas-water to a separation of tar and water, difficulties may arise because the average specific gravity of tar and tar oil is close to the specific gravity of water. For this reason it may be more desirable to cool the gas in several stages, in a plurality of heat exchangers connected in series. This fractional distillation of tar and water and the scrubbing of other substances from the raw gas affords the further advantage that an economical recovery of water is enabled and waste heat at temperatures above 100° C can be used to produce steam in the first cooling stages.

The tar-containing aqueous condensate which becomes available in the various cooling and condensing stages used for the fractional condensation is fed to at least two different gravity separators. One separator serves to remove water and higher-boiling tar fractions. It is supplied with the condensate from the first cooling stages. This condensate is hotter than the condensate of the succeeding cooling stages and is generally at a temperature above 100° C. A second separator separates water, which has formed in the succeeding cooling stages, from the lower-boiling tar fractions, which are generally called tar oil.

It has been found, however, that it is difficult to separate the tar and water coming from the first cooling stages because tar-water emulsions may form as a result of an interaction of substances which are contained in the raw gas and are contained in the water after the first scrubbing and condensing stage. The substances having the emulsifying activity are organic and inorganic substances. It is known that ash which has been entrained by the gas and scrubbed off in the first cooling stage can promote the formation of emulsion, particularly if the ash contains lime and lime phenolates may form. There are some other mechanisms which may promote an emulsion.

Emulsions may be broken by demulsifiers. Calcium chloride, e.g., has been used with good success. A disadvantage resides in the costs involved and in the additional pollution of the water with inorganic substances.

The pH-value of the water is generally above 8. Emulsions of water and tar can be broken by a reduction of the pH-value, i.e., by an acidification. This measure is not feasible in practice in view of the high rates at which gas water becomes available in the beneficiation of coal.

SUMMARY

The invention is based on the use of aqueous solutions of ammonium carbonate to break the emulsion. Ammonium carbonate is contained in the condensed water during the cooling of the gas and is contained therein in the last cooling stages in a higher proportion, which is sufficient for demulsification.

The solubility of ammonia and also of $CO_2$ in water is low at elevated temperatures and increases as the water temperature decreases. For this reason the $NH_3$-$CO_2$ content in the gas-water from the first cooling stage is very low. It has been found that tar-water emulsions can be prevented or broken if the ammonia content exceeds 5 grams ammonia per kg $H_2O$. This must be accompanied by a corresponding content of $CO_2$. It has been found that the demulsifying activity does not strictly depend on the ammonia content but mainly on the content of ammonium carbonate and/or ammonium bicarbonate. Because the $NH_3$-$CO_2$ compounds are present in water in various forms, the content of ammonia ($NH_3$) will be selected hereinafter as a reference value.

The invention is based on the step of feeding condensed water coming from succeeding cooling stages and having a high $NH_3$-$CO_2$ content to the separator for separating tar and condensed water which come from the first cooling stage and have only a low content of ammonia and of $NH_3$-$CO_2$ compounds and the ammonia content in the tar and water separator associated with the first cooling stage is thus raised above 5 g ammonia per kg $H_2O$.

A preferred process within the invention is a separation process for removing tar from water in a condensate formed by the cooling of a raw gas produced by the gasification or dry distillation of solid fuels, particularly coal which comprises cooling the raw gas in a plurality of stages, the hotter condensate from at least one of the first cooling stages, which is cooled to a temperature above 100° C being mixed at a weight ratio of 10:1 to 1:2 with colder condensate from at least one of the succeeding cooling stages, which cools to a temperature below 120° C, and feeding the resulting mixture to a tar-water separator.

DESCRIPTION OF THE DRAWING

An illustrative embodiment of the process will be explained with reference to the drawing.

DESCRIPTION

Coal is fed through conduit 1 into a gas-producing reactor 2 and is gasified there under a pressure of 20–80 bars by a treatment with oxygen from conduit 3 and water vapor from conduit 4. The raw gas is at a temperature of 300°–700° C as it leaves the reactor 2 through the conduit 5 and there enters a scrubber-cooler 6, in which the raw gas is intensely sprayed with condensate produced in the process itself and fed through conduit 7. The raw gas is thus cooled and saturated with water vapor.

The gas cooler 10, which may constitute a wasteheat boiler, is supplied through conduit 8 with raw gas and through conduit 9 with the condensate which has been produced in the process itself and is circulated in a surplus through the scrubber-cooler. Part of the condensate which collects in the sump of the gas cooler 10 is recirculated through conduit 7 into the scrubber-cooler 6. Surplus condensate is removed from the cooling system through conduit 11 and subjected to the further processing described hereinafter. The scrubber-cooler 6 and the gas cooler 10 together constitute the first cooling stage for the raw gas. The pressure in this cooling stage is approximately the same as in the gas-producing reactor 2.

The water and tar condensate from the first cooling stage is under superatomspheric pressure and is fed to the tar separator 19 at a temperature above 100° C through conduit 11. The separator 19 is operated under a lower pressure, generally under atmospheric pressure. The heavier tar and dust are separated from the water by gravity in the separator. For this purpose the water must be flashed first. As the condensate is flashed to a lower pressure through the pressure relief valve 20 into the flashing vessel 21, vapors are flashed off and part of the substances dissolved in the gas-water and other substances are liberated. These vapors from the water and the flashed-off gases are discharged through conduit 23 and are condensed and cooled in the cooler 24. This flashing involves a loss of ammonia and $CO_2$ in the condensate which flows through conduit 22 into the separator 19. As a result, the formation of emulsions is promoted in the mixture contained in the separator 19 and the gravity separation of tar and water is thus rendered more difficult. To oppose this, the condensate from the cooler 24 is fed into the separator 19 through conduit 25.

The cooler 24 may be replaced by a cooler (not shown), which is incorporated in the conduit 11 before the pressure relief valve 20 and in which the water is cooled to temperatures of, e.g., 60° C. As a result, a formation of flashed-off vapors involving a loss of $NH_3$ and $CO_2$ during the flashing into the flashing vessel 21 is virtually avoided.

From the separator 19, the water is discharged through conduit 27 and the tar and tar-bonded dust are discharged through conduit 26. The measures adopted to prevent an emulsification in the separator 19 will be described hereinafter.

Raw gas from waste-heat boiler 10 enters the conduit 12 at a temperature of about 120°–200° C, mainly at a temperature of 150°–190° C. In a succeeding cooling stage, which may consist of a waste-heat boiler 13 or another heat exchanger, the gas is further cooled to a temperature of about 80°–150° C and is then supplied through the conduit 14 to a third cooling stage 15. The gas leaving this cooling stage in conduit 16 has preferably a temperature below 100° C.

The cooling circuits required for the waste-heat boilers 10 and 13 and for the third cooling stage 15 have been omitted in the drawing for the sake of clearness. Cooling is effected in each case by indirect heat exchange so that the coolant is not present in the condensate which is formed. The cooling may be divided into more cooling stages than are shown on the drawing.

The condensate formed in the waste-heat boiler 13 of the second cooling stage contains much more ammonium carbonate and ammonium bicarbonate than the condensate in conduit 11 and contains about 8–15 g $NH_3$ per kg $H_2O$. The condensate formed in the third cooling stage 15 contains still more ammonium carbonate and ammonium bicarbonate, up to about 30 grams $NH_3$ per kg $H_2O$. The condensate from these cooling stages is also approximately under the pressure under which gas is produced in the reactor 2.

The condensate from the second and third cooling stages contains tar oil fractions and, as the cooling proceeds, also fractions of gasoline or petrol from gas. To remove gas-water, the mixture of water, tar oil and gasoline or petrol from gas is also subjected to gravity separation. This mixture is fed to the flashing vessel 30 through conduit 28 and pressure relief valve 29. The vapors and gases are fed through conduit 34 to the cooler 35 and are condensed and cooled therein. The mixture of tar oil and water is fed to the gravity separator 31. In this mixture, the tar oil has a lower specific gravity than the water and is withdrawn through conduit 32 whereas the water is discharged through conduit 33. The ammonium carbonate content of this gas-water is above the critical valve of 5 grams ammonia per kg $H_2O$ and this gas water can be fed through the conduit 33a, indicated by a dotted line, to the separator 19 associated with the first cooling stage.

The condensate from the last cooling stage 15 has an even higher ammonia content and contains lower-boiling tar fractions and has a higher content of gasoline or petrol from gas. It is known by experience that in a gravity separator, tar and a very light tar oil fraction do not mix but the tar subsides and the light fraction of tar oil and gasoline or petrol from gas rises in the water. For this reason the water which comes from the cooler 15 and has a very high ammonia content can be fed to the tar separator 19 together with a fraction of tar oil and gasoline or petrol from gas. This is indicated in the drawing by the conduit 17. In this case there is no need to provide an intermediate separator for tar oil and water and, owing to the higher ammonia content, a lower rate of water will be sufficient to raise the ammonium carbonate concentration in the tar separator 19 to or above the critical lower limit of 5 grams $NH_3$ per kg $H_2O$. The tar oil which is separated from this mixture of heavy tar, water and lighter tar oil is withdrawn through conduit 35. The mixed condensates in the separator 19 are preferably at a temperature of 60°–80° C.

Because a water is fed which contains so much ammonium carbonate that the ammonium content of the mixture contained in the separator 19 is above 5 grams ammonia per kg $H_2O$, the formation of an emulsion can be prevented. The water drained through conduit 27 then contains only traces of tar.

The lower limit of the rate at which ammonium carbonate is admixed to break an emulsion in the condensate may depend to some extent on the content of inorganic constituents, such as dust of ash.

EXAMPLE 1 metric ton of coal having an upper calorific value of 6000 kcal/kg is gasified in one hour by a treatment with 250 standard cubic meters oxygen and 1400 kg water vapor under a pressure of 25 bars in a gas-producing reactor 2 to produce 1750 standard m$^3$ dry gas which contains 1067 kg water vapor and is at a temperature of 500° C. After the first cooling stage (see also the drawing), the raw gas at a temperature of 170° C leaves the waste-heat boiler 10. 385 kg condensed water, which contain 1078 grams $NH_3$, are discharged through conduit 11 so that the content of $NH_3$-$CO_2$ compounds, expressed as $NH_3$-content, amounts to 2.8 grams $NH_3$ per kg water. This water contains also tar, phenols, fatty acids, $CO_2$, other dissolved gas and inorganic impurities. As the water is flashed through valve 20 into the flashing vessel 21, 56 kg water vapor are flashed off; they are recondensed in the cooler 24. This condensate contains 585 grams $NH_3$, which correspond to 10.4 grams $NH_3$ per kg gas-water. This condensate is returned through conduit 25 into conduit 22 so that the condensed water in the separator 19 has the original ammonia content of 2.8 grams per kg $H_2O$.

Ammonium carbonate and/or ammonium bicarbonate is to be fed to the separator 19 at such a rate that the ammonia content is in excess of 5 grams per liter. For this reason the water from the last cooling stage is fed through conduit 17. The gas is cooled in the cooler 13 and enters the cooler 15 at a temperature of 120° C and leaves it through conduit 16 at 40° C. 117 kg water thus become available, which contain 3159 grams $NH_3$ and have a corresponding $CO_2$ content. This water contains also a very light fraction of tar oil and gasoline or petrol from gas as well as phenols and fatty acids and dissolved gases. The ammonia concentration is 27 grams $NH_3$ per kg $H_2O$. When this water is fed through conduit 17 into the separator system of the first cooling stage, the ammonium carbonate content in the separator 19 is raised to 8.44 grams $NH_3$ per kg $H_2O$. The fraction of tar oil and gasoline or petrol from gas which is contained in this case in the water from the cooler 15 floats on the water and is withdrawn through conduit 35. The relatively high ammonium carbonate content prevents the formation of an emulsion in the separator 19.

What is claimed is:

1. Separation process for removing tar from water in a condensate formed by the cooling of a raw gas produced by the gasification of coal with oxygen and water vapor under a pressure of 20–80 bars, which comprises treating said raw gas in a scrubbing and cooling zone and withdrawing said condensate, enriching said condensate with at least one member of the group consisting of ammonium carbonate and ammonium bicarbonate to a concentration of at least 5 grams $NH_3$ per kg $H_2O$, and separating tar from said condensate in a separation zone.

2. Separation process for removing tar from water in a condensate formed by the cooling of a raw gas produced by the gasification or dry distillation of solid fuels particularly coal which comprises cooling the raw gas in a plurality of stages, mixing the hotter condensate from at least one of the first cooling stages which is cooled to a temperature above 100° C at a weight ratio of 10:1 to 1:2 with colder condensate from at least one of the succeeding cooling stages, which cools to a temperature below 120° C, and feeding the resulting mixture containing at least one member of the group consisting of ammonium carbonate and ammonium bicarbonate with a concentration of at least 5 grams $NH_3$ per kg $H_2O$ to a tar-water separation zone.

3. Process of claim 2 wherein condensate at a temperature of 60°–80° C is fed to the tar-water separator.

4. Process of claim 2 wherein the mixture of hotter and colder condensates is flashed from a pressure of at least 5 bars, the flashed-off vapors are condensed at least in part, and the resulting condensate is mixed with the flashed condensate.

5. Process of claim 1 wherein condensate at a temperature of 60°–80° C is fed to the tar-water separator.

* * * * *